Figure 1:
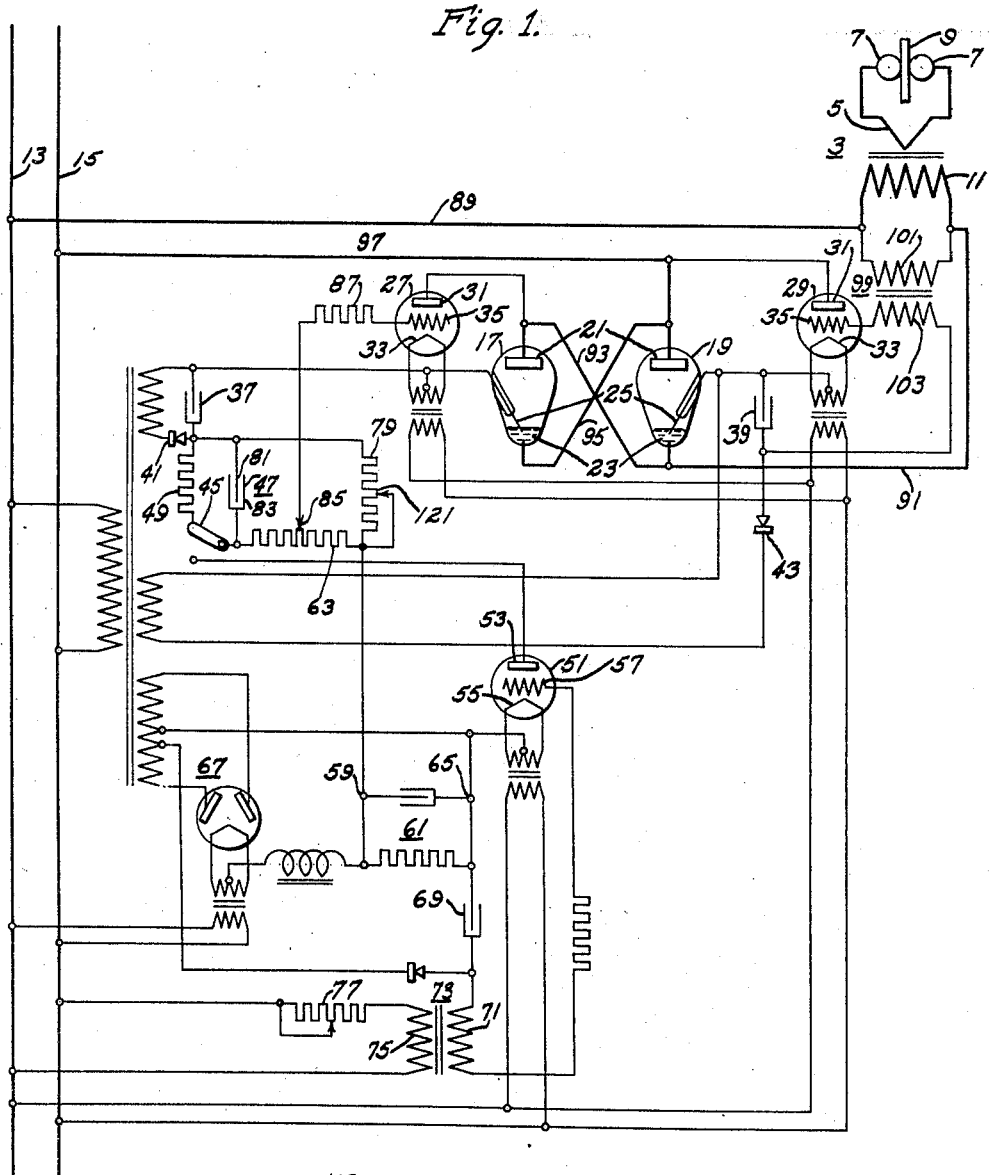

Dec. 24, 1940.　　　F. H. GULLIKSEN　　　2,226,375
SPOT WELDING TIMER
Filed July 28, 1938

WITNESSES:
Leon M. Garman
Hymen Diamond

INVENTOR
Finn H. Gulliksen.
BY
F. W. Lyle.
ATTORNEY

Patented Dec. 24, 1940

2,226,375

UNITED STATES PATENT OFFICE 2,226,375

SPOT WELDING TIMER

Finn H. Gulliksen, Wilkinsburg, Pa., assignor to Westinghouse Electric & Manufacturing Company, East Pittsburgh, Pa., a corporation of Pennsylvania Application July 28, 1938, Serial No. 221,857

9 Claims. (Cl. 250—27)

My invention relates to electric discharge apparatus and has particular relation to apparatus for controlling the supply of power to resistance welding systems.

In the welding of materials that require a relatively fine adjustment of the current-time product, the welding current is supplied from the alternating current source, commonly of the commercial frequency type, and is controlled by electric discharge valve means of the arc-like discharge type interposed between the source and the load. To time the supply of welding current, a capacitor is connected in the control circuits of the valve means. The capacitor is charged during each welding operation and the welding interval is determined by the time required for the potential difference between the plates of the capacitor to attain a predetermined value.

While the capacitor timing system as described above is eminently satisfactory where the duration of the welding pulses is relatively short as, for example, of the order of 5 to 10 half-periods of a 60-cycle source, difficulty is encountered where the duration is longer. For example, if the duration is of the order of 20 half-periods of a 60-cycle source, the time rate of variation of the potential impressed between the plates of a capacitor of dimensions permitted by practical considerations is relatively small. In such a case, small differences in the circuit such as differences in the initial potential impressed on the capacitor from the source result in substantial variations in the timing.

Of predominant importance in this connection is the arc-drop of the auxiliary starting valve through which the capacitor is customarily charged. The arc drop of this valve varies over a substantial range in response to temperature changes and other unavoidable influences. As a result of the variations, the potential impressed across the capacitor changes to a substantial extent and the time required for the potential impressed across the plates of the capacitor to vary from one value to a second value is substantially varied.

It is accordingly an object of my invention to provide apparatus for precisely timing the supply of welding current to a material that requires welding pulses persisting for an interval of time of substantial length.

A more general object of my invention is to provide apparatus for precisely timing the supply of current from a source to a load that requires power in discrete pulses.

A more specific object of my invention is to provide a timing device, incorporating a capacitor and a discharge valve of the arc-like type through which the capacitor is charged, for controlling the supply of current from a source to a load, in which variations, arising in the time required for the capacitor to charge to a predetermined potential by reason of variations in the arc drop across the valve, shall be compensated.

Another specific object of my invention is to provide a device for precisely timing the supply of welding current from a source of alternating current of commercial frequency to a material that requires the current in pulses persisting for an interval of time of the order of 20 half-periods of the source.

More concisely stated, it is an object of my invention to provide a resistance welding system in which the timing shall take place by the operation of a contrivance including a discharge device of the arc-like type, and the effects of variations in the arc drop of the discharge device on the timing shall be compensated.

According to my invention, precise timing is attained by varying the potential impressed in the control circuit of the valve means controlling the supply of power to the load in accordance with the variations of the initial potential impressed across the timing capacitor. This object is accomplished by simply connecting a voltage divider between the capacitor to be charged and the charging source, and connecting one of the conductors whereby potential is impressed in control circuit of the valve means to the adjustable tap of the voltage divider.

Figure 2:
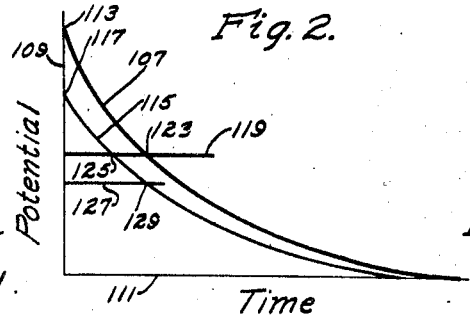

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawing in which:

Figure 1 is a diagrammatic view showing a preferred embodiment of my invention, and Fig. 2 is a graph illustrating the operation of my invention.

The apparatus shown in Figure 1 comprises a welding transformer 3 across the secondary 5 of which a pair of welding electrodes 7 are connected. The material 9 to be welded is engaged by the electrodes 7 and when current is supplied to the primary 11 of the transformer, welding current is transmitted through the material.

The primary 11 of the transformer 3 is supplied from the line conductors 13 and 15 of a suitable source (not shown) which may be of the ordinary commercial type, through a pair of electric discharge valves 17 and 19 connected in antiparallel. Each of the valves is preferably of the immersed-ignition-electrode type and comprises an anode 21 of nickel, carbon or other suitable material, a mercury pool cathode 23, and an ignition electrode 25 of high resistance material such as boron carbide, which dips into the mercury.

Ignition current is supplied to each of the valves 17 and 19 through associated ignition valves 27 and 29, respectively, which may be of the arc-like discharge type. Each of the ignition valves comprises an anode 31, a hot cathode 33 and a control electrode 35 and a suitable gaseous medium such as would be provided, for example, by a mercury globule within the valve. Each of the ignition valves 27 and 29 is initially maintained non-conductive by a biasing potential provided by charging biasing capacitors 37 and 39 through rectifiers 41 and 43 from the supply lines 13, 15.

To initiate a welding operation, a manually operable circuit controller 45 which may be a foot switch or any other suitable structure, is moved from a position in which it connects a timing capacitor 47 across a discharging resistor 49 to a position in which it closes a circuit through a starting valve 51. The latter valve is of the arc-like type and comprises an anode 53, a hot cathode 55 and a control electrode 57 and a gaseous medium at a suitable pressure. By the operation of the starting switch 45 the anode 53 of the valve 51 is connected to the positive terminal 59 of a direct current potential source 61 through a voltage divider 63. The negative terminal 65 of the source 61 is permanently connected to the cathode 55 of the starting valve 51. The direct current potential may be derived from the main line conductors 13, 15 through a suitable full-wave rectifying system 67.

As is the case for the ignition valves 27 and 29, the starting valve 51 is supplied with a blocking potential from a biasing capacitor 69. A potential of peaked wave form is superimposed on the biasing potential through the secondary 71 of a saturable transformer 73, the primary 75 of which is connected across the line conductors 13 and 15 through a rheostat 77. The primary and secondary circuits of the saturable transformer 73 are maintained permanently closed and for this reason the peaked impulses of the source are continuously impressed between the control electrode 57 and the cathode 55 of the timing valve. The phase position of the impulses in the half cycles of the supply potential is predetermined by the magnitude of the rheostat 77 in the primary circuit of the transformer 73.

Before the starting switch 45 is operated the impulses in the control circuit of the starting valve 51 have no effect. On the occurrence of an impulse in the control circuit of the starting valve 51 during the first positive half cycle of anode-cathode potential after the starting switch 45 has been operated, the valve is rendered conductive. Current now flows in a circuit extending from the positive terminal 59 of the direct current source 61 through the voltage divider 63, the manual switch 45, the anode 53 and cathode 55 of the starting valve 51 to the negative terminal 65 of the source. The timing capacitor 47 is connected in series with a rheostat 79 across the voltage divider 63. Hence, when current flows through the divider 63, the capacitor 47 is charged with its upper plate 81 positive and its lower plate 83 negative, the rate of charge depending on the magnitude of the rheostat 79.

The junction point of the upper plate 81 of the timing capacitor 47 and the rheostat 79 is connected to the cathode 33 of one of the ignition valves 27 through the biasing capacitor 37 while the adjustable tap 85 of the voltage divider 63 is connected to the control electrode 35 of the same valve through a grid resistor 87. The potential impressed between the control electrode 35 and the cathode 33 of the ignition valve 27 is therefore equal to the potential difference between the adjustable tap 85 of the divider 63 and the upper plate 81 of the capacitor 47 plus the biasing potential. Initially the former potential is algebraically positive and sufficient to counterbalance the blocking effect of the latter potential. As the capacitor 47 charges, the magnitude of the positive potential is gradually decreased until the blocking potential again becomes effective. For the ignition valves most commonly used in practice, the blocking potential becomes effective when the potential provided by the charged capacitor 47 is within a potential of the order of one or two volts neutralizing the potential impressed through the divider 63.

The ignition valve 27 is connected to the supply lines 13, 15 in a circuit which extends from the line 13 through a conductor 89, the primary 11 of the welding transformer 3, a conductor 91, a conductor 93, the anode 31 and the cathode 33, the ignition electrode 25 and the cathode 23 of the associated main valve 17, a conductor 95, a conductor 97 to the other line conductor 15. During the time that the blocking potential is counterbalanced the ignition valve 27 is rendered conductive in each half cycle for which its anode-cathode potential is positive, and renders the associated main valve 17 conductive so that welding current is supplied to the material 9. The current flow through the material 9 during any one of the positive half cycles commences at some point in the half cycle determined by the setting of the rheostat 77 and continues to flow until an angle determined by the power factor of the load and the angle of starting is reached in the succeeding negative half cycle. The magnitude of the potentials applied in the control circuit of the ignition valve 27 and the rate of charging of the capacitor are such that the main valve 17 conducts current during alternate half cycles for a period of time dependent on the desired character of the welding.

The ignition valve 29 associated with the other main valve 19 is supplied with potential from a transformer 99 the primary 101 of which is connected directly across the primary 11 of the welding transformer 3. The secondary 103 of the former transformer 99 is connected between the control electrode 35 and the cathode 33 of the ignition valve 29 through the biasing capacitor 39. When the current flow through the main valve 17 and the welding transformer 3 is being interrupted, a potential is impressed across the control transformer 99 of the other ignition valve 29. Since at this time the right-hand line conductor 15 is positive relative to the left-hand conductor 13 and the anode-cathode potential of the ignition valve 29 is positive, the latter valve is rendered conductive and an ignition impulse is supplied through it to its associated main valve 19. Half waves of current of opposite polarity to that supplied through the valve 17 are thus supplied through the valve 19 as long as the blocking potential on the ignition valve 27 is counterbalanced. Accordingly, after the switch 45 is closed, a series of current impulses are supplied to the welding material 9 for an interval of time predetermined by the rate of charging of the timing capacitor 47.

Since the timing capacitor 47 is charged through the starting valve 51 and in turn determines how long valves 17 and 19 remain conductive, the arc-drop across valve 51 would materially affect the timing, particularly in cases in which the welding time is so long that the rate of charging of the capacitor is small if the capacitor potential alone would determine the control potential of ignition valve 27. In accordance with my invention, however, the control potential of the latter valve is determined not only by the capacitor 47 but by the voltage divider 63 and the latter compensate for variable arc-drop in the valve 51.

The potential between the control electrode 35 and the cathode 33 of the valve 27 is equal to the potential across the left-hand portion of the voltage divider 63 plus the potential across the timing capacitor 47 plus the biasing potential. The potential across the left-hand portion of the rheostat 63 is dependent on the potential across the whole rheostat and this in turn the potential of the direct current source 61 minus the arc-drop across the starting valve 51 and so is dependent on the arc-drop across the valve. The variable tap 85 of the voltage divider 63 is so set that by reason of this dependence the variations in the arc-drop across the timing valve are compensated.

The function of the voltage divider in producing the compensation is illustrated graphically in Fig. 2. In this view, potential is plotted as ordinate and time as abscissa. The heavy curve 107 extending from the potential axis 109 to the time axis 111 represents the potential impressed across the rheostat 79 as a function of time for a minimum value of arc-drop in the timing valve 51. At time zero, which is assumed to be the time of closure of the manual switch 45, this potential is equal to the potential of the direct current source 61 minus the arc drop in the timing valve. Hence the height point of intersection 113 of the curve 107 and the potential axis 109 represents the latter potential value. As the timing capacitor 47 charges the potential decreases in accordance with the curve 107.

The light line curve 115 of similar form to the heavy line curve represents the potential across the rheostat 79 for a valve 51 having a substantially larger arc drop than in the first case. Since the potential absorbed by the valve 51 is now larger than for the case represented by the heavy curve 107, the initial potential impressed across the rheostat 79, as represented by the point of intersection 117 of the curve 115 and the potential, is smaller.

The upper heavy horizontal line 119 represents the potential of the control electrode 35 of the ignition valve 27 relative to the movable tap 121 of the rheostat 79 when the arc drop in the starting valve 51 has the lower value. To simplify the explanation, it is assumed that the movable tap 85 of the voltage divider 63 is located at its electrical center so that the potential of the movable tap is equal to half the potential of the direct current source 61 minus the arc drop in the starting valve 51. The line 119, therefore, is located at a height equal to half the height of point 113 above the time axis.

To further simplify the explanation, we may assume that the biasing potential impressed on the ignition valve 27 is such that the latter becomes non-conductive when the potential between the movable tap 85 of the voltage divider and the upper terminal 81 of the capacitor 47 is zero or less, i. e., when the timing network 47, 63, 79 supplies zero potential in the control circuit of the valve 27. This condition occurs at a time represented by the point of intersection 123 of the heavy horizontal line 119 and the heavy curve 107. With the starting valve 51 operating in correspondence with the heavy curves 107 and 119 in Fig. 2, the current will be conducted through the material 9 to be welded for an interval of time corresponding to the distance along the time axis 111 of Fig. 2 from the center of coordinates to the intersection 123. In apparatus constructed in accordance with the teachings of the prior art, the control electrode 35 of the ignition valve 27 in lieu of being connected to the movable tap 85 of a voltage divider 63, such as is shown in Fig. 1, is connected to some point in the direct current source and its potential does not change when the arc-drop across the valve 51 varies. Therefore, in a prior art case in which the arc-drop is represented by the light curve 115, the main valves 117 and 119 conduct only for a time represented by abscissa of the point of intersection 125 of the heavy line 119 and the light curve 115. It is seen that this interval of time is substantially smaller than the time represented by the point 123.

However, in apparatus constructed in accordance with my invention, the potential of the control electrode 35 for the higher arc-drop case is half the potential of source 61 minus the higher arc-drop and is represented by the light horizontal line 127, the ordinate of which is half the ordinate of the point 117. The time of conduction of the welding current being again assumed to end at the point where the output potential of the network 47, 63, 79 is zero, is now at the point of intersection 129 of the light line 127 and the light curve 115. The point 129, it will be noted, is directly below the intersection 123 of the heavy line 119 and curve 107 and, therefore, the time of conduction is the same.

Many modifications may be made in the apparatus and arrangement of parts illustrated without departing from the spirit of my invention, and I do not wish to be limited otherwise than by the scope of the appended claims.

I claim as my invention:

1. For use in supplying power from a source of periodically pulsating current to a load that requires the power in pulses persisting for a predetermined number of periods of said source, the combination comprising, valve means interposed between said source and said load for controlling the flow of current to said load, timing means including electric discharge means of the arc-like type for controlling said valve means and means for compensating for the variation in the operation of said timing means that arises by reason of the variation in the arc-drop of said electric discharge device.

2. For use in supplying power from a source of periodically pulsating current to a load that requires the power in pulses persisting for a predetermined number of periods of said source, the combination comprising, valve means, of the type having a pair of electrodes between which a potential of predetermined initial magnitude is to be impressed to render said valve means conductive, interposed between said source and said load for controlling the flow of current to said load, timing means including an impedance to be connected to said elecrodes, electric discharge means of the arc-like type through which current is supplied to said impedance for controlling said valve means and means for compensating for the variation in the operation of said timing means that arises by reason of the variation in the arc-drop of said electric discharge device, the last said means comprising means for varying the potential of one of said electrodes in accordance with the variations in the arc-drop.

3. For use in supplying power from a source of periodically pulsating current to a load that requires the power in pulses persisting for a predetermined number of periods of said source, the combination, comprising valve means of the type that requires a potential of a predetermined initial magnitude to render it conductive interposed between said source and said load for controlling the flow of current to said load, timing means including a capacitor from which said potential is derived and means, including electric discharge means of the arc-like type for charging said capacitor, for controlling said valve means, and means for compensating for the variation in the time required for charging said capacitor to a predetermined potential difference.

4. For use in supplying power from a source of alternating current of commercial frequency to a load which is of the type that requires the power in pulses persisting for an interval of time of the order of 20 half-periods of said source, the combination comprising valve means interposed between said source and said load for controlling the flow of current to said load, timing means, including electric discharge means of the arc-like type, for controlling said valve means, and means for compensating for the variation in the operation of said timing means that arises by reason of the variation in the arc-drop in said discharge.

5. For use in supplying power from a source of periodically pulsating current to a load which is of the type that requires power in pulses persisting for a predetermined number of periods of said source, the combination comprising valve means of the type having a pair of electrodes between which potential of predetermined control magnitude is to be impressed to render said means conductive, interposed between said source and said load for controlling the flow of current to said load, timing means, including a capacitor, a second source of potential and an electric discharge device of the arc-like discharge type connected so that said capacitor is charged through said device from said source, for controlling said valve means, said capacitor being connected at one terminal to one of said electrodes, and means for compensating for the variation in the time required for charging said capacitor to a predetermined potential that arises by reason of the variation in the arc-drop in said discharge means, said compensating means comprising a voltage divider connected between said second source and the other terminal of said capacitor and having a tap connected to said other electrode.

6. For use in supplying power from a source of periodically pulsating current to a load which is of the type that requires power in pulses persisting for a predetermined number of periods of said source, the combination comprising valve means, of the type having a pair of electrodes between which a potential of predetermined control magnitude is to be impressed to render said means conductive, interposed between said source and said load for controlling the flow of current to said load, timing means, including a capacitor, a second source of potential, a variable resistance, and an electric discharge of the arc-like discharge type connected so that said capacitor is charged through said device and said resistance from said source, for controlling said valve means, said capacitor being connected at one terminal to one of said electrodes, and means for compensating for the variation in the time required for charging said capacitor to a predetermined potential that arises by reason of the variation in the arc-drop in said discharge means, said compensating means comprising a voltage divider connected between said second source and the other terminal of said capacitor and having a tap connected to said other electrode.

7. For use in supplying power from a source of periodically pulsating current to a load which is of the type that requires power in pulses persisting for a predetermined number of periods of said source, the combination comprising valve means of the type having a pair of electrodes between which a potential of predetermined control magnitude is to be impressed to render said means conductive interposed between said source and said load for controlling the flow of current to said load, timing means including a capacitor, and a variable resistance connected in series, a second source of potential and an electric discharge device of the arc-like discharge type, connected so that said capacitor is charged through said device and said resistance from said source, for controlling said valve means, said capacitor being connected at one terminal to one of said electrodes and means for compensating for the variation in the time required for charging said capacitor to a predetermined potential that arises by reason of the variation in the arc-drop in said discharge means, said compensating means comprising a voltage divider bridging said resistance and said capacitor and having a tap connected to said other electrode.

8. For use in supplying power from a source of periodically pulsating current to a load which is of the type that requires power in pulses persisting for a predetermined number of periods of said source, the combination comprising valve means interposed between said source and said load for controlling the flow of current to said load, timing means including impedance means and means for supplying current to said impedance means for controlling said valve means and means for compensating for the variation in the opeartion of said timing means that arises by reason of the variation in the potential impressed across said impedance.

9. For use in supplying power from a source of periodically pulsating current to a load which is of the type that requires power in pulses persisting for a predetermined number of periods of said source, the combination comprising valve means interposed between said source and said load for controlling the flow of current to said load, timing means including a capacitor and means for charging said capacitor, for controlling said valve means and means for compensating for the variation in the time required for said capacitor to be charged to a predetermined potential that arises by reason of the variation in the initial potential impressed across said capacitor.

FINN H. GULLIKSEN.